(12) United States Patent
Mills et al.

(10) Patent No.: US 8,627,769 B2
(45) Date of Patent: *Jan. 14, 2014

(54) CEMENTITIOUS COMPOSITIONS

(75) Inventors: Peter Shelley Mills, Stamping Ground, KY (US); Rory John Michael Harris, Nicholasville, KY (US)

(73) Assignee: Minova International Limited, Chesterfield, Derbyshire (GB)

( * ) Notice: Subject to any disclaimer, the term of this patent is extended or adjusted under 35 U.S.C. 154(b) by 330 days.

This patent is subject to a terminal disclaimer.

(21) Appl. No.: 12/843,260

(22) Filed: Jul. 26, 2010

(65) Prior Publication Data
US 2011/0259228 A1 Oct. 27, 2011

Related U.S. Application Data

(63) Continuation-in-part of application No. 12/766,028, filed on Apr. 23, 2010, now Pat. No. 8,413,584.

(51) Int. Cl.
*F42D 3/00* (2006.01)
(52) U.S. Cl.
USPC .............................. 102/333; 102/313; 299/13
(58) Field of Classification Search
USPC .......... 102/301, 304, 313, 333; 166/192, 203; 299/13
See application file for complete search history.

(56) References Cited

U.S. PATENT DOCUMENTS

| | | | |
|---|---|---|---|
| 4,481,037 A | | 11/1984 | Beale et al. |
| 4,513,665 A | * | 4/1985 | Ricketts et al. ............... 102/312 |
| 5,071,496 A | * | 12/1991 | Coursen et al. ................. 149/21 |
| 5,096,497 A | | 3/1992 | Beale et al. |
| 7,033,430 B2 | * | 4/2006 | Mills ............................ 106/606 |
| 2004/0050300 A1 | | 3/2004 | Mills |

FOREIGN PATENT DOCUMENTS

| | | |
|---|---|---|
| GB | 1 205 378 | 9/1970 |
| WO | WO 02/084207 | 10/2002 |

OTHER PUBLICATIONS

Combined Search and Examination Report dated Dec. 7, 2010, Corresponding UK Application No. GB1013264.5.

* cited by examiner

*Primary Examiner* — James Bergin
(74) *Attorney, Agent, or Firm* — Nixon & Vanderhye P.C.

(57) ABSTRACT

The invention provides a method of preparing a blast hole which method comprises the steps of:
 drilling a blast hole;
 placing explosives in the blast hole;
 filling the blast hole with a stemming material comprising a cement composition and water wherein the weight ratio of water to solids content of the stemming material is at least about 1:1.

22 Claims, 4 Drawing Sheets

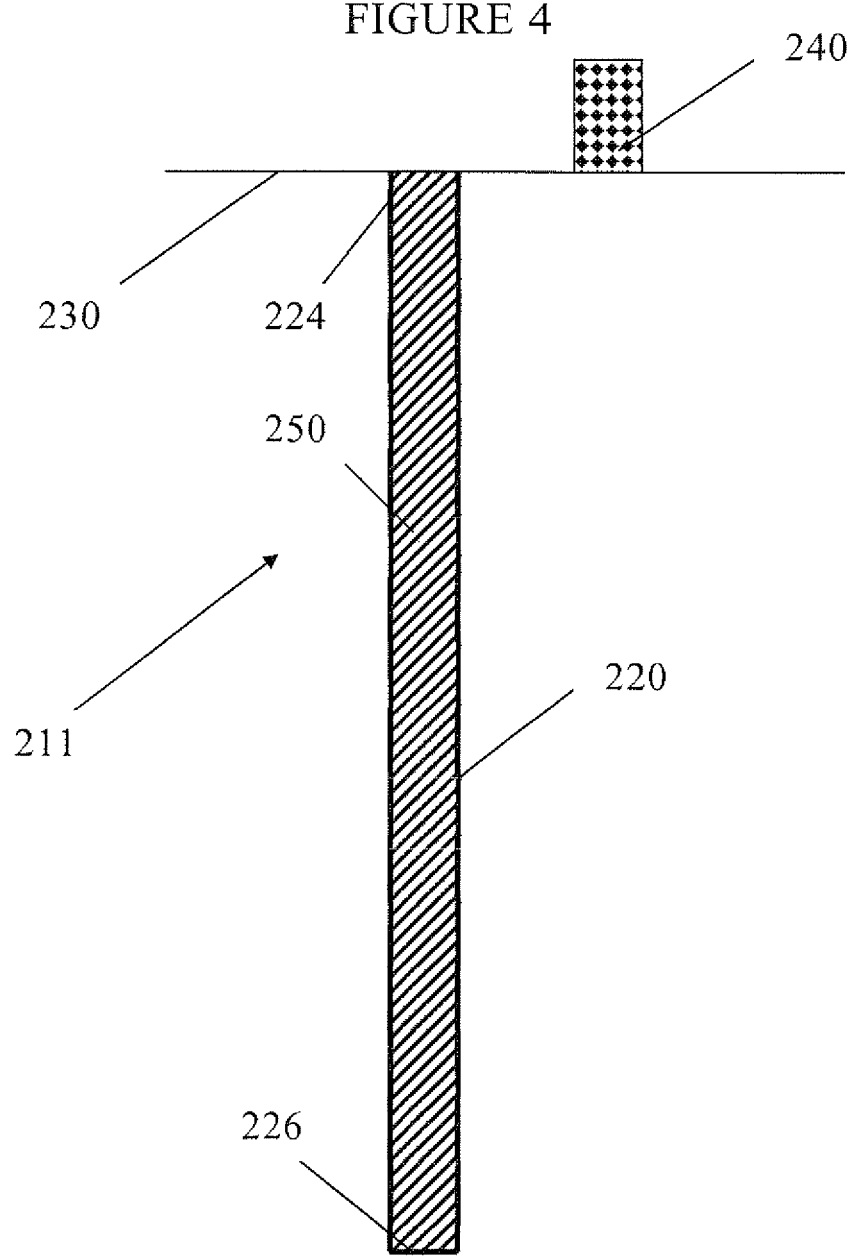

CEMENTITIOUS COMPOSITIONS

This application is a continuation-in-part of U.S. application Ser. No. 12/766,028 filed Apr. 23, 2010, the entire contents of which is hereby incorporated by reference.

The present invention relates to a method of stemming a blast hole and a stemmed blast hole.

When a seismic survey is conducted, seismic waves are generated by explosives placed in a borehole. Such an explosives filled borehole is generally known as a shot hole. A shot hole is typically 16-100 feet (5-30 m) deep and contains from 2 to 20 lbs (0.9 to 9 kg) of explosive. As the seismic waves pass through the ground and encounter different materials, some of their energy is reflected off the boundaries between the different strata while other waves will pass through. The reflected energy returns to the surface, where its speed and strength is measured by special detectors, known as geophones. The geophones convert the movement of the ground into electrical signals, which are then digitized by seismometers. This digitised data is then subjected to computer analysis to generate a three dimensional image of the subsoil.

When explosives are placed in a borehole to form a shot hole for use in a seismic survey, it is usual practice to place a stemming material between the explosive and the surface of the rock or soil. Similarly, when explosives are placed in a borehole to form a blast hole for use in ground breaking, a stemming material is placed between the explosive and the surface of the rock or soil. Traditional stemming materials include a bentonite gel, borehole drill cuttings, gravel, sand etc. The aim of the stemming material is to prevent the energy from the explosion from dissipating back up the borehole which would reduce the power of the seismic waves generated or reduce the ground breaking effect of the explosives. These traditional techniques are not satisfactory because in a significant proportion of explosions, the stemming material is forced explosively out of the borehole. This causes lots of problems: a crater may be formed at the surface which usually has to be remediated at significant cost; the stemming material can be scattered over a large area despoiling the countryside; any animals or people in the vicinity of the hole could be killed or injured; and the explosion loses a significant proportion of its energy which could be used for seismic mapping or for ground breaking purposes.

A very strong stemming material like concrete is unsuitable because in the event it is ejected from the hole, it would likely stay intact and become a projectile capable of serious damage. Also, a very strong stemming material is more likely to cause damage to agricultural implements such as a plough. A very weak stemming material is also unsuitable because it will be insufficiently strong to resist the force of the explosion.

A way of ameliorating these problems has been sought.

According to the invention there is provided a method of preparing a blast hole which method comprises the steps of:
   drilling a blast hole;
   placing explosives in the blast hole;
   filling the blast hole with a stemming material comprising a cement composition and water wherein the weight ratio of water to solids content of the stemming material is at least about 1:1.

According to the invention there is also provided a method of stemming a blast hole which method comprises the step of filling a blast hole with a stemming material comprising a cement composition and water wherein the weight ratio of water to solids content of the stemming material is at least about 1:1.

It has been found that a stemming material comprising a mixture of a cement composition with a comparatively high proportion of water has the ability to achieve a very low rate of borehole blowouts. Such a stemming material has the additional benefit that in the unlikely event it did blow out, it is sufficiently weak that it will not form a projectile but will instead break up into smaller less harmful pieces. The high proportion of water in the stemming material also minimises the quantity of the cement composition required to be transported to places with difficult access. This is because the bulk of the stemming material is provided by the water which is less dense than the cement composition and because the water can be added at the site.

In some embodiments, the stemming material used in the invention may be pumpable so that it can be prepared at a base location and then transported to the site of each blast hole by being pumped through a pipe.

The term "blast hole" refers to a bore hole containing explosives and includes a shot hole for use in seismic surveying. A blast hole may be used for ground breaking in a mine, quarry, tunnel, construction site or any other situation where explosives are used to break up soil and/or rock formations. A blast hole may have a depth of from about 2 feet (0.6 m) to about 500 feet (150 m).

In some embodiments, the steps of the method of the invention may be carried out sequentially. The method of the invention may comprises the sequential steps of:
   (a) drilling a blast hole;
   (b) placing explosives in the blast hole; and
   (c) filling the blast hole with a stemming material comprising a cement composition and water wherein the weight ratio of water to solids content of the stemming material is at least about 1:1.

In some embodiments, the steps of the method of invention may be carried out in a different order. The method of the invention may comprise the sequential steps of:
   (i) drilling a blast hole;
   (ii) filling the blast hole with a stemming material comprising a cement composition and water wherein the weight ratio of water to solids content of the stemming material is at least about 1:1; and
   (iii) placing explosives in the blast hole containing stemming material. It has been found that if placing step (iii) is carried out shortly after filling step (ii), it is possible to drop or push the explosives through the stemming material.

In some embodiments, drilling step (i) is performed using a hollow drill stem (for example a hollow metal drill stem). In some embodiments, a step (i)(a) is included after drilling step (i) and before filling step (ii) where step (i)(a) comprises flushing the hollow drill stem with water, for example to flush out drilling cuttings from the drill stem.

The term "filling" as used in the present application means placing the stemming material in the blast hole. A blast hole prepared by the method of the invention is a blast hole which is at least partially full of stemming material. In some embodiments, the filling step of the method of the invention comprises placing a sufficient amount of stemming material to prevent dissipation of energy from the explosives when detonated. A skilled person would easily be able to determine a sufficient amount of stemming material based on factors such as the nature and amount of explosives, the nature of the stemming material and the weight ratio of water to solids content of the stemming material and the nature of terrain where the blast hole is drilled. In some embodiments, the blast hole may be from half full of stemming material to completely full of stemming material, for example about two thirds full or completely full of stemming material.

In some embodiments, the blast hole may be one of an array of a plurality of blast holes, particularly where the blast holes are for use in seismic surveying. Where the invention is being used with an array of blast holes, each blast hole may be prepared with the steps of the method of the invention being performed sequentially on each blast hole in turn. Thus a first blast hole may be prepared by the drilling, placing and filling steps (or by drilling, filling and placing steps), then a second and then a third and so on. Alternatively, where the invention is being used with an array of blast holes, each step of the method of the invention may be prepared on each blast hole in turn. Thus each blast hole in the array is first drilled, then each blast hole in the array is subjected to the placing step and finally each blast hole is filled. In the latter use of the method of the invention with a blast hole array, some time may pass between the placing and filling steps. In circumstances such as this or where there is a high water table or where water is used in the drilling step (e.g. to flush out drilling cuttings), the blast hole may contain water after the drilling step or after the placing step.

In some embodiments, where the blast hole contains water, the water in the blast hole may be used to at least partially supply the water required to form the stemming material. In such a circumstance, the filling method may comprise pumping a cement composition having a reduced water content (e.g. a cement composition where the weight ratio of water to solids content of the stemming material is less than about 1:1; for example a dry cement composition) into the blast hole which contains water.

In some embodiments, where the blast hole contains water, the filling step is performed using a tremie method. The term "tremie method" refers to a method where the cement composition is pumped into a blast hole containing water such that dilution of the cement composition by the water is minimised. One way of performing a tremie method is to use a pipe or a hollow drill stem having an outlet at its distal end to pump the cement composition into the blast hole and to maintain the outlet of the pipe or hollow drill stem below the level of the stemming material in the blast hole.

In some embodiments, the cement composition is a high yielding cement composition. The term "high yielding cement composition" refers to a cement which is capable of forming a high strength cement even in the presence of a high proportion of water. A person of skill in the art would be able to determine suitable components for a high yielding cement composition depending upon the type of blast hole in which the composition is to be used, ambient conditions where the blast hole is located, type or size of explosives etc.

In some embodiments, the cement composition may comprise a cement comprising calcium oxide, calcium hydroxide, Portland cement and/or a high alumina cement and optionally one or more of the following ingredients:

(a) a calcium sulphate source;
(b) a reactive silica source;
(c) a suspension agent;
(d) a retarding agent; and/or
(e) an additive.

The term "Portland cement" refers to a cement which contains tricalcium silicate ($C_3S$ in cement notation or $(CaO)_3.SiO_2$ in conventional notation) and dicalcium silicate ($C_2S$ in cement notation or $(CaO)_2.SiO_2$ in conventional notation) in a total amount of at least 50% by weight of the cement. A person of skill in the art would be able to determine a suitable Portland cement depending upon the other components of the cement composition. In some embodiments, Portland cement may be present in an amount from 8% by weight, preferably from 10% by weight, more preferably from 12% by weight.

The term "% by weight" for an ingredient of the cement composition refers to a percentage by weight of the total solids content of the cement composition.

The term "high alumina cement" refers to a cement which is also known as calcium alumina cement and may be a cement which when compared to a Portland cement has a relatively high alumina content in which the alumina is present as a reactive calcium aluminate and/or as a reactive calcium sulphoaluminate and/or as an amorphous glass form. A person of skill in the art would be able to determine a suitable high alumina cement depending upon the other components of the cement composition. The high alumina cement may be provided by a high alumina cement, sometimes referred to as Ciment Fondu which normally contains about 40 to 80% by weight of calcium aluminate phases (or 40 to 50% of calcium aluminate(CA)). In some embodiments, the high alumina cement may be present in an amount from 4% by weight, preferably from 6% by weight, more preferably from 8% by weight.

The term "calcium aluminate" refers to any aluminate-containing cement such as CA, $CA_2$, $C_3A$, $C_{12}A_7$, $C_4AF$ and $C_{11}A_7.CaF_2$, calcium sulphoaluminate and calcium ferroaluminate and analogues thereof; where C represents CaO and A represents $Al_2O_3$. A person of skill in the art would be able to determine a suitable calcium aluminate depending upon the other components of the cement composition.

The term "calcium sulphoaluminate" refers to pure calcium sulphoaluminate which is of the formula $C_4A_3S^*$ where C and A are as defined above and $S^*$ represents $SO_3$. This is sometimes known as Klein's compound and may also be written as $3CaO.3Al_2O_3.CaSO_4$.

The term "calcium sulphate source" refers to any source of calcium sulphate which is suitable for forming a cementitious composition. A person of skill in the art would be able to determine a suitable source of calcium sulphate. For example a suitable calcium sulphate source includes beta anhydrite, gypsum or hemi-hydrate; typically beta anhydrite is used optionally in combination with gypsum and/or hemi-hydrate. In some embodiments, the calcium sulphate source may be present in an amount from 1% by weight, preferably from 2% by weight preferably to 15% by weight, preferably to 10% by weight, more preferably to 6% by weight.

The term "reactive silica source" refers to any source of reactive silica which is suitable for forming a cementitious composition. A person of skill in the art would be able to determine a suitable reactive silica source. For example a suitable reactive silica source includes a ground granulated blast furnace slag (GGBFS), a pozzolan, pulverised flyash, silica fume or other glassy mixtures of lime and silica; typically GGBFS is used optionally in combination with a pozzolan, pulverised flyash, silica fume or other glassy mixtures of lime and silica. In some embodiments, the reactive silica source may be present in an amount from 1% by weight, preferably from 5% by weight, more preferably from 10% by weight preferably to 70% by weight, preferably to 60% by weight, more preferably to 50% by weight.

The term "pozzolan" refers to a siliceous ash which may be a non-aluminous cement. A person of skill in the art would be able to determine a suitable pozzolan depending upon the other components of the cement composition. For example the pozzolan may be a blast furnace slag, flyash (for example class C or class F flyash), a reactive clay (such as metakaolin) and/or silica fume.

The term "suspension agent" refers to any agent which is capable of suspending a powdered non-soluble ingredient of the cement component in water; in other words, the suspension agent reduces the settling out of a powdered non-soluble ingredient of the cement component when it is added to water. A person of skill in the art would be able to determine a suitable suspension agent depending on the other components of the cement composition. For example, the suspending agent may be a cellulose ether; a polymer such as a polyacrylamide, polyethylene oxide and/or a polyacrylate; a gum such as welan gum, guar gum, xanthan gum and/or gum acacia; starch, heetorite, bentonite, finely divided amorphous silica and/or attapulgite. In some embodiments, the suspension agent may be present in an amount from 0.1% by weight, preferably from 0.2% by weight, preferably to 25% by weight, more preferably to 15% by weight, more preferably to 10% by weight.

The term "retarding agent" refers to any agent which is capable of slowing the rate of curing of the cement component. A person of skill in the art would be able to determine a suitable retarding agent depending upon the other components of the cement composition. For example, the retarding agent may be a polysaccharide, carboxylic acid, a hydrocarboxylic acid (for example citric acid), carboxylic acid salt (such as sodium gluconate), glucose, fructose, lactose and/or sucrose. In some embodiments, the retarding agent may be present in an amount from 0.1% by weight, preferably from 0.2% by weight, preferably to 10% by weight, more preferably to 5% by weight.

The term "additive" refers to any further additive required for the correct functioning of the cement composition. A person of skill in the art would be able to determine a suitable additive depending upon the other components of the cement composition. For example, the additive may be an anti washout retarder (e.g. a natural or synthetic polymer) to encapsulate particles of the cement component, an accelerator or set control agent (for example an alkali metal carbonate such as lithium or sodium carbonate), a gelling agent, and/or an antifoaming agent. In some embodiments, the additive may be present in an amount from 0.02% by weight, preferably from 0.2% by weight, preferably to 10% by weight, more preferably to 5% by weight.

In some embodiments, the cement composition may comprise a reactive silica source (for example a pozzolan, particularly a blast furnace slag and/or a reactive clay such as metakaolin) and an activator.

The term "activator" refers to a compound which is capable of reacting with a reactive silica source to produce a high yielding cement composition. A person of skill in the art would be able to determine a suitable activator depending upon the other components of the cement composition. For example, the activator may be an alkali such as lime (CaO or $Ca(OH)_2$), sodium silicate, Portland cement or caustic soda (NaOH).

In some embodiments, the methods of the invention comprise the step of preparing a stemming material by mixing the cement composition with the water. In some embodiments, the methods of the invention comprise the step of preparing a stemming material by mixing a first component with a second component wherein the first and/or the second cement components contain the water. In some embodiments, the step of preparing the stemming material may be carried out in the blast hole or in a mixer placed near or above the blast hole.

The term "first component" refers to a first part of the cement composition. In some embodiments, the first component may comprise a cement, water, optionally a reactive silica source, optionally a retarding agent and optionally a suspension agent.

The term "second component" refers to a second part of the cement composition. In some embodiments, the second component may comprise a reactive silica source, a calcium sulphate source, water and/or a cement.

In some embodiments, the cement composition may be a one part cement composition, for example a one part cement composition which is ettringite forming. Such an ettringite-forming cement composition may comprise a high alumina cement, a calcium sulphate source (preferably beta-anhydrite) and optionally calcium oxide and/or calcium hydroxide. In particular, the ettringite-forming cement composition may be a cement composition described in U.S. Pat. No. 4,481,037 (particularly the cement composition described from column 1 line 55 to column 5 line 64 of U.S. Pat. No. 4,481,037). The contents of U.S. Pat. No. 4,481,037 are incorporated herein in their entirety by reference.

In some embodiments, the ettringite-forming cement composition comprises high alumina cement and the calcium sulphate source in a weight ratio of from 3:7 to 4:1.

In some embodiments, calcium oxide and/or calcium hydroxide and/or Portland cement (as a source of CaO or $Ca(OH)_2$) is included in the ettringite-forming cement composition to improve the formation of ettringite during hydration of the cement composition by increasing the amount of $3CaO.Al_2O_3$ present.

The term "ettringite" refers to a calcium trisulphoaluminate having 32 molecules of water of crystallisation and which has the formula $3CaO.Al_2O_3.3CaSO_4.32H_2O$. Ettringite is produced by the hydration of cementitious compositions containing calcium aluminate and calcium sulphate, and British Patent No. 1506417 describes the use of a composition containing Portland cement, aluminous cement and calcium sulphate. The contents of GB 1 506 417 are incorporated herein in their entirety by reference. In the composition of British Patent No. 1506417 the aluminous cement is mainly $CaO.Al_2O_3$ and $CaO.2O_3$ together with at least 15% by weight $12CaO.7Al_2O_3$ and the calcium sulphate may be any of the available forms of calcium sulphate such as a dihydrate, a hemihydrate or an anhydrate.

In some embodiments, the cement composition may be a two part cement composition which is ettringite-forming. A first part of the two part ettringite-forming cement composition may comprise water, a reactive silica source, and a high alumina cement. A second part of the two part ettringite-forming cement composition may comprise water, a calcium sulphate source and calcium oxide and/or calcium hydroxide. In particular, the two part ettringite-forming cement composition may be a composition as described in U.S. Pat. No. 5,096,497 (particularly the composition described from column 1 line 13 to column 3 line 63 of U.S. Pat. No. 5,096,497). The contents of U.S. Pat. No. 5,096,497 are incorporated herein in their entirety by reference.

In some embodiments, the high alumina cement used in the first part of the two part ettringite-forming cement composition has a C:A (calcium oxide (CaO) to aluminate ($Al_2O_3$)) molar ratio of greater than 1:1. For example the high alumina cement comprises $C_4AF$ (tetracalcium alumino ferrite $((CaO)_4.Al_2O_3.Fe_2O_3)$) and $C_{12}A_7$ $((CaO)_{12}.(Al_2O_3)_7)$.

In some embodiments, the cement composition may be a two part cement composition wherein a first part of the two part cement composition comprises Portland cement, water, optionally a retarding agent and optionally a suspension agent and a second part of the two part cement composition comprises an aqueous solution of a reactive silica source. In particular, the two part cement composition may be a composition as described in US patent publication 2004/0050300 (particularly the composition described from paragraph 10 at page 1 to paragraph 100 at page 5 of US patent publication 2004/0050300). The contents of US patent publication 2004/0050300 are incorporated herein in their entirety by reference.

It will be appreciated by one skilled in the art that the strength of the cement composition used in the invention can be adjusted by altering the ratio of water to powder or water to solids. In all instances though the ratio of water to powder or water to solids will be at least about 1:1 and preferably at least about 1.5 to 1, more preferably at least about 2:1, more preferably at most about 5:1. This is a very high ratio of water to solids compared to normal cementitious grouts or concrete.

The use of a two component cement composition, whilst adding mechanical complexity, largely eliminates the potential for blockage in the hoses feeding the boreholes as each component has a long set time until it is mixed with the other component. Alternatively a single component cement composition may be used.

In some embodiments, the cement composition has at least a 20 minute working time at 100° F. (38° C.) which is necessary when the method of the invention is used in the summer.

Where the cement composition comprises a single component, it may be mixed with water in a batch or continuously mixed and then either pumped down a hose into the blast hole or simply poured into the blast hole.

Where the cement composition comprises two components, each component is mixed up and pumped separately. The two components may be brought together for mixing at a convenient location which could either be in the borehole or outside the borehole.

Once the desired quantity of the cement composition has been pumped or poured into the borehole it is left to cure. Some cement compositions can be cured sufficiently so that after a few minutes the explosive may be detonated. It is more usual for the cement composition to be left for at least 7 days as there is often no urgency to fire the blast holes quickly. The cement compositions described herein can be effective after a few minutes, or even after weeks or months.

The cement compositions in U.S. Pat. No. 4,481,037, U.S. Pat. No. 5,096,497 and US patent publication 2004/0050300 are sold by Minova International Limited under the tradenames Tekpak® and Tekpak P®. These cement compositions are used in the production of supportive materials for use in crib bags for mine roof control in a mined area where the compositions need to be capable of withstanding a constant pressure of up to 1000 psi (69 bar) without yielding. There is no disclosure or suggestion in U.S. Pat. No. 4,481,037, U.S. Pat. No. 5,096,497 and US patent publication 2004/0050300 that the disclosed compositions are capable of withstanding a sudden high pressure force. When a seismic explosive such as Orica gelatine dynamite product Geogel™ is detonated, the initial explosive pressure is 157 Kbar.

The explosive pressure from the explosives is applied to a much smaller area of the cement composition as a blast hole has a smaller cross-sectional area than a crib bag. A blast hole typically has a radius of about 2 to 5 inches (5 to 13 cm) and a cross-sectional area of about 0.2 square feet (0.02 m$^2$). In contrast, a crib bag has a length of about 8 foot (2.4 m) and a width of about 4 foot (1.2 m) and a cross-sectional area of about 32 square feet (2.9 m$^2$). Therefore in the invention, the stemming material has a working area which withstands the applied force which is approximately 0.6% of the working area of the cement composition when it is used in mine roof control. Thus it is surprising that the cement compositions of U.S. Pat. No. 4,481,037, U.S. Pat. No. 5,096,497 and US patent publication 2004/0050300 are useful in the method of the invention as they are withstanding a sudden pressure which is approximately 2300 times greater than that withstood in a mine roof control application on a much smaller working area.

According to the invention there is also provided a stemmed blast hole having a proximal end at ground level and a distal end wherein the blast hole has an explosive at its distal end and wherein the blast hole contains a stemming material comprising a cement composition and water wherein the weight ratio of water to solids content of the stemming material is at least about 1:1.

In some embodiments, the stemmed blast hole contains a sufficient amount of stemming material to prevent dissipation of energy from the explosives when detonated. In some embodiments, the stemmed blast hole may be filled with stemming material.

According to the invention there is further provided a method of withstanding an explosive blast at a location which method comprises the step of providing at the location a stemming material comprising a cement composition and water wherein the weight ratio of water to solids content of the stemming material is at least about 1:1.

The term "location" refers to any location at which an explosive may be used such as a mine, quarry, earthwork, explosive test site, military location, construction site, avalanche control site etc.

The invention will now be illustrated with reference to the following Figures of the accompanying drawings which are not intended to limit the scope of the invention claimed, wherein:

FIG. 4 shows a schematic cross-sectional view of the blast hole of FIG. 3 after it has been filled with stemming material but before explosives have been placed.

Figure 1:
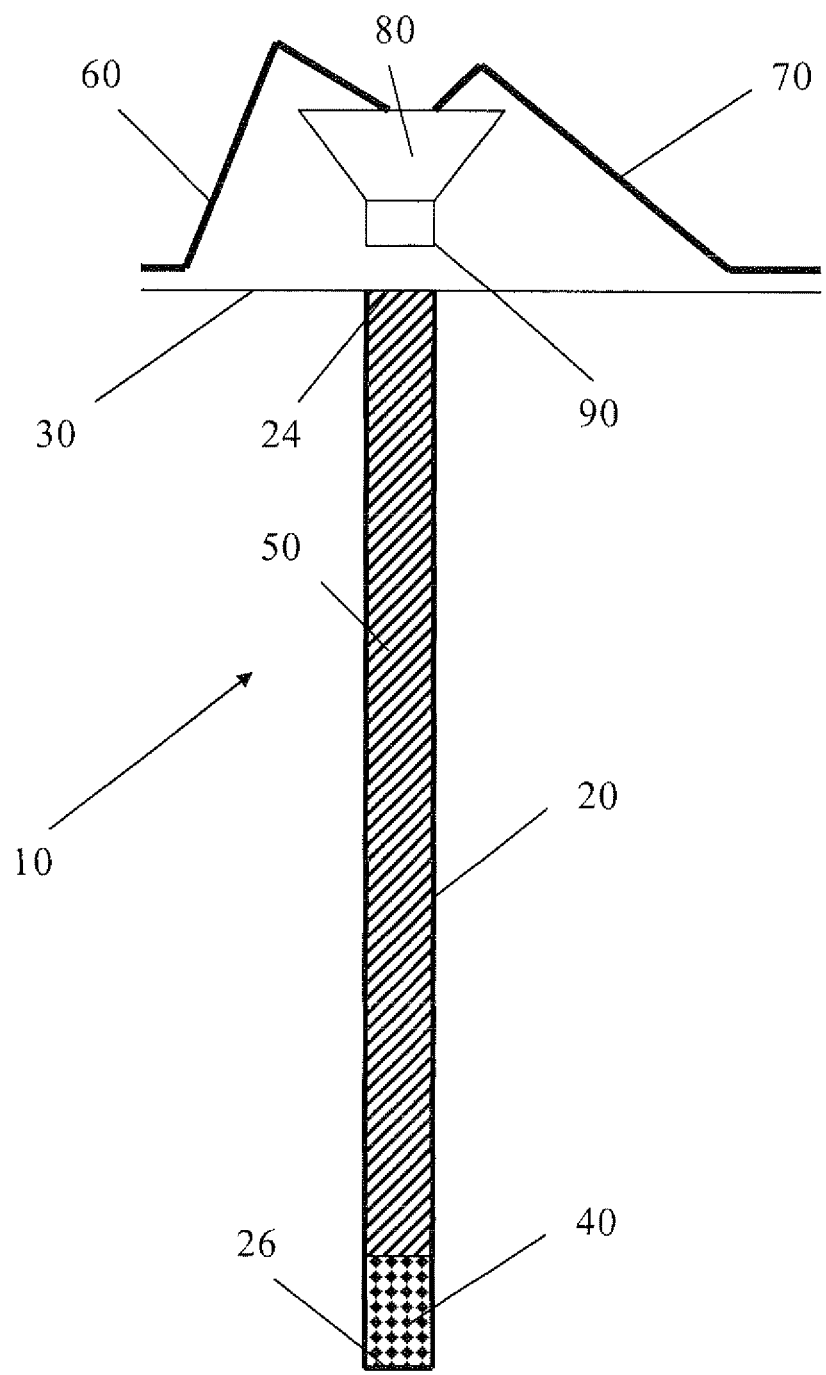
FIG. 1 shows a schematic cross-sectional view of a blast hole filled with explosives and a cement composition.

FIG. 1 shows a stemmed blast hole generally at 10. It is formed by blast hole 20 which has a proximal end 24 at ground level 30 and a distal end 26. The distance between the proximal end 24 of the blast hole 20 and the distal end 26 is the depth of the blast hole 20. Explosives 40 have been placed at the distal end 26 of the blast hole 20.

The blast hole 20 containing explosives 40 is filled with stemming material 50 formed from a two part cementitious composition. One part of the cementitious composition is supplied by pipe 60 and the other part of the cementitious composition is supplied by pipe 70. The two parts of the cementitious composition are mixed in mixer 80 and then supplied to the blast hole 20 by supply head 90.

In some embodiments, the mixer 80 and supply head 90 may be dispensed with by mixing the two parts of the cementitious composition directly in the blast hole 20. In some embodiments, the supply head 90 may be replaced by a feed pipe that is inserted into the blast hole. In some embodiments, mixer 80 and supply head 90 may be formed by a Y-shaped connector which connects supply pipes 60,70 to a feed pipe that is inserted into the blast hole. In some embodiments, where the cementitious composition has one part (such as the composition of Example 4), it is supplied by one pipe 60 or 70 which is inserted directly into the blast hole 20.

Figure 2:
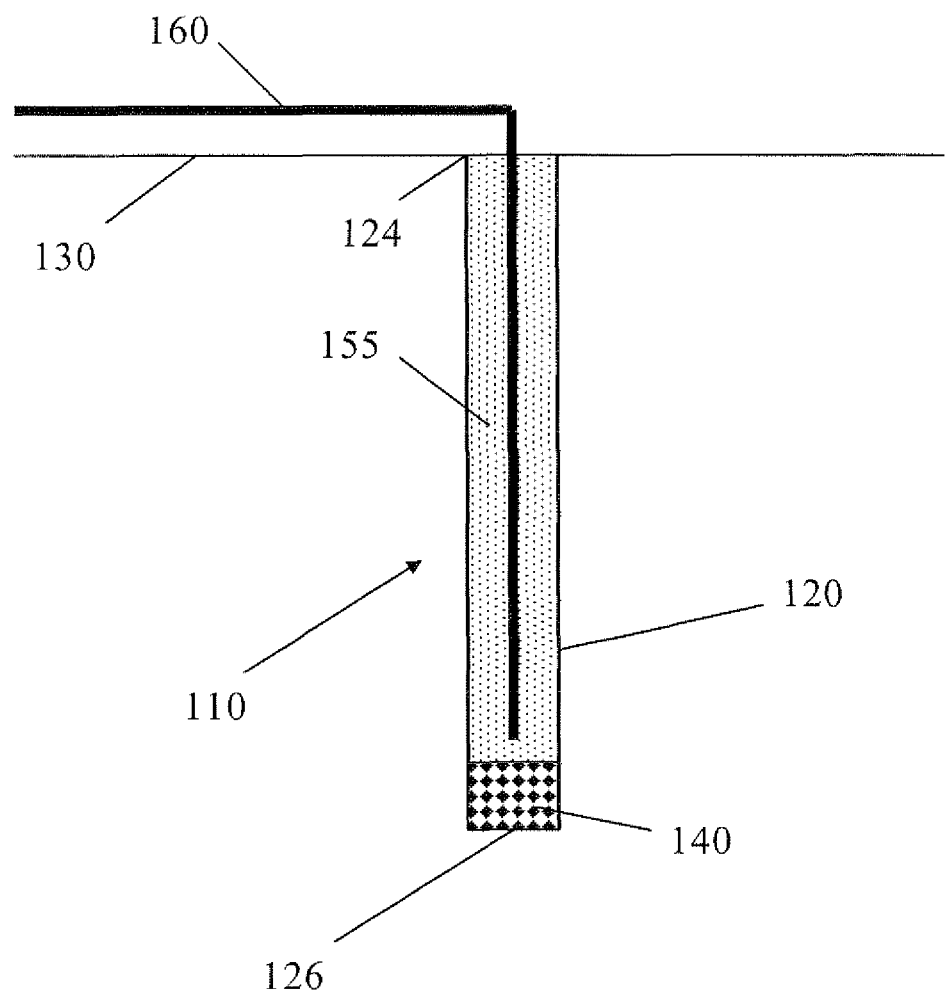
FIG. 2 shows a schematic cross-sectional view of a drilled blast hole containing explosives and water, ready to be treated by the method of the invention.

FIG. 2 shows a drilled blast hole containing apparatus suitable for filling the blast hole which is indicated generally at 110. It is formed by blast hole 120 which has a proximal end 124 at ground level 130 and a distal end 126. The distance between the proximal end 124 of the blast hole 120 and the distal end 126 is the depth of the blast hole 120. Explosives 140 have been placed at the distal end 126 of the blast hole 120.

The blast hole 120 containing explosives 140 also contains water 155 due to water being used in the drilling of the blast hole 120 or due to a high water table. Feed pipe 160 is arranged in blast hole 120 initially close to its distal end 126. Feed pipe 160 is used to supply the stemming material (not shown). The stemming material is supplied in a single part composition prepared as described in Example 4. The blast hole 120 is filled with stemming material using a tremie method such that the distal end of feed pipe 160 is kept immersed in stemming material. This is in order that rising stemming material from the distal end 126 of blast hole 120 displaces water without the cement content of the stemming material being washed out.

As the height of the stemming material in blast hole 120 rises, feed pipe 160 is retracted from the blast hole 120. In some embodiments, a spray head (not shown) or flared head (not shown) may be provided at the distal end of feed pipe 160 to minimise dilution of the cement composition and to aid mixing of the cement composition and the water.

In some embodiments, where a two component cement composition is used, the two components may be provided by two feed pipes connected by a Y-shaped connector to a feed pipe which is inserted into the blas hole.

Figure 3:
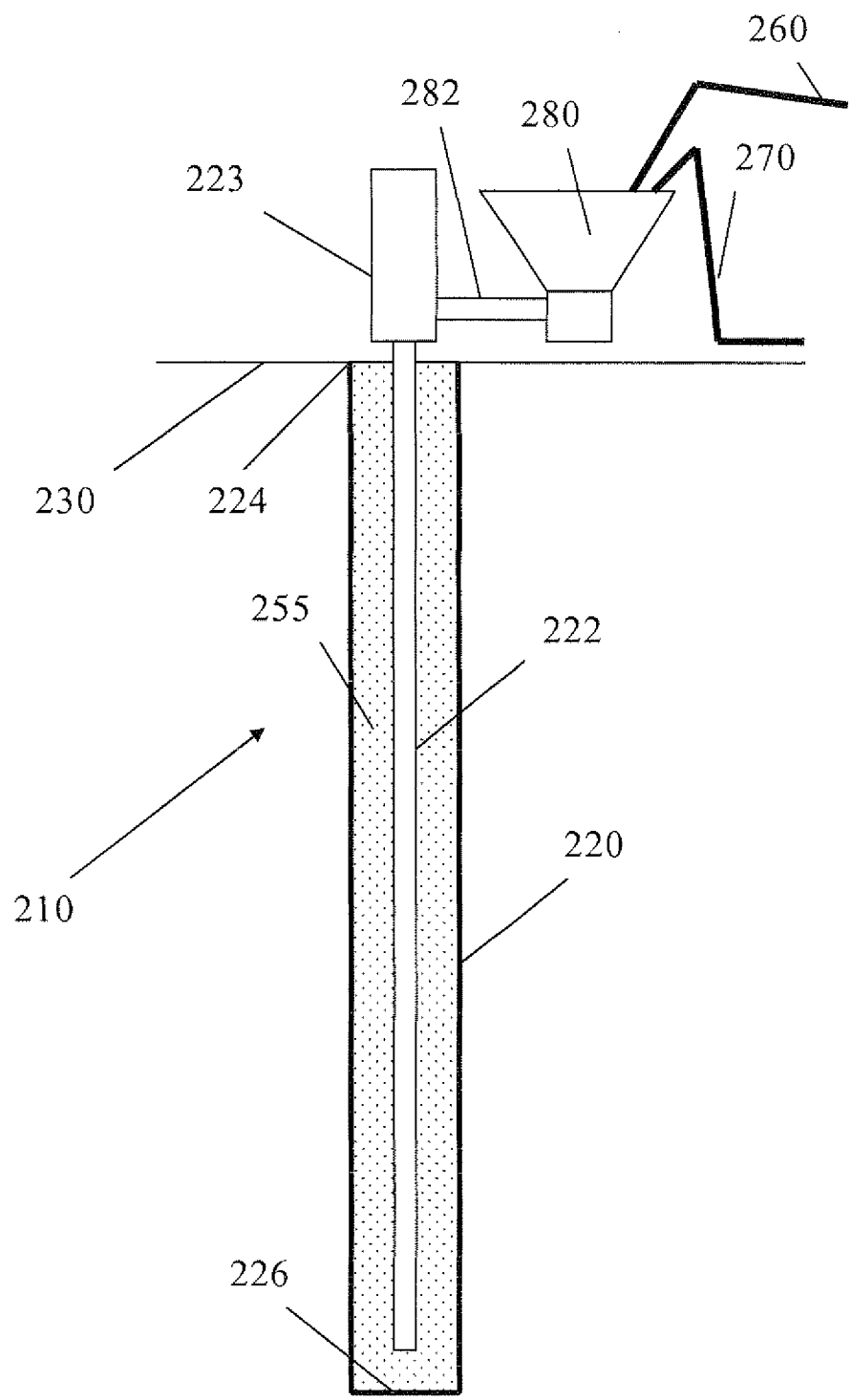
FIG. 3 shows a schematic cross-sectional view of a blast hole after it has been drilled but before it has been filled with stemming material.

FIG. 3 shows a drilled blast hole containing a hollow metal drill stem apparatus suitable for drilling and filling the blast hole which is indicated generally at 210. It is formed by blast hole 220 which has a proximal end 224 at ground level 230 and a distal end 226. The distance between the proximal end 224 of the blast hole 220 and the distal end 226 is the depth of the blast hole 220.

The blast hole 220 contains water 255 due to water being used in the drilling of the blast hole 220 or due to a high water table. Drill stem 222 which was used to drill blast hole 220 is left positioned in the blast hole 220, close to its distal end 226. Drill stem 222 was operated by drilling machinery 223. As drill stem 222 is hollow, it can be used to supply the stemming material (not shown). The stemming material is formed by mixing a first part supplied by pipe 260 and a second part which is supplied by pipe 270 in mixer 280. The stemming material is pumped from mixer 280 to drilling machinery 223 through supply pipe 282. The blast hole 220 is filled with stemming material using a tremie method such that the distal end of drill stem 222 is kept immersed in stemming material. This is in order that rising stemming material from the distal end 226 of blast hole 220 displaces water without the cement content of the stemming material being washed out.

As the height of the stemming material in blast hole 220 rises, drill stem 222 is retracted from the blast hole 220. At the completion of the filling method, a filled blast hole indicated generally at 211 in FIG. 4 is obtained. Like features to FIG. 3 are indicated in FIG. 4 by like reference numerals. Thus blast hole 220 has been filled with stemming material 250. In the next step, the explosives 240 are placed at the distal end 226 of blast hole 220 to obtain a stemmed blast hole according to the invention.

In some embodiments, mixer 280 may be formed by a Y-shaped connector which connects supply pipes 260,270 to supply pipe 282. In some embodiments, where the cementitious composition has one part (such as the composition of Example 4), it is supplied by one pipe 260 or 270 which is connected directly to the drilling machinery 223 such that there is no mixer 280.

The invention will now be illustrated by the following Examples which are not intended to limit the scope of the invention claimed.

EXAMPLE 1

A cement composition may be prepared as described in Example 1H of U.S. Pat. No. 4,481,037 by preparing a first part of the composition containing a LAFARGE FONDU high alumina cement having a surface area of 298 $m^2$/kg and a second part containing 72.0% by weight of the second part of beta-anhydrite, 5.0% by weight of the second part of $CaSO_4.2H_2O$, 5.0% by weight of the second part of calcium oxide, 17.6% by weight of the second part of clay and 0.4% by weight of the second part of $Li_2CO_3$.

The composition contains 182 kg high alumina cement, 182 kg other solids and 910 kg water (91% by volume and 72% by weight).

The beta-anhydrite is a finely ground material and the bentonite is a natural calcium montmorillonite clay which has been activated by an addition of 3% sodium carbonate. The first part is adjusted to have a pH of 7.0 before use. After 7 days, the cured composition has a strength of 5.10 $MNm^{-2}$.

A blast hole is drilled to a depth of 100 foot (30 m) and then an explosive charge such as the Orica seismic gelatine dynamite Geogel™ is inserted into the blast hole. The two parts of the composition prepared as described above are then poured into the blast hole. After 7 days, the explosive charge is detonated and no disturbance of the blast hole is detectable at ground level at or near the blast hole after detonation.

A further blast hole is drilled to a depth of 100 foot (30 m) and an explosive charge such as the Orica seismic gelatine dynamite Geogel™ is inserted into the blast hole. After 3 days, the blast hole has filled with water and the two parts of the composition prepared as described above are then piped into the blast hole using a tremie method. The two parts of the composition are used in equal volumes and with a water to solids weight ratio of 2.38:1. After 7 days, the explosive charge is detonated and no disturbance of the blast hole is detectable at ground level at or near the blast hole after detonation.

A further blast hole is drilled to a depth of 100 foot (30 m) using a hollow metal drill stem. The hollow drill stem is then flushed with water. The two parts of the composition prepared as described above are then placed in the blast hole using a tremie method to form a stemming material. The two parts of the composition are used in equal volumes and with a water to solids weight ratio of 2.38:1. Finally, an explosive charge such as the Orica seismic gelatine dynamite Geogel™ is pushed through the stemming material to the distal end of the blast hole. After 7 days, the explosive charge is detonated and no disturbance of the blast hole is detectable at ground level at or near the blast hole after detonation.

EXAMPLE 2

A cement composition may be prepared as described in the Example of U.S. Pat. No. 5,096,497 at column 3 lines 5 to 62 by preparing a first part of the composition by mixing 80.00 parts by weight of a high alumina cement (containing 54% by weight of ferrite, 23% by weight of CA, 14% by weight of $C_{12}A_7$ and 9% by weight of $C_2AS^*$), 20.00 parts by weight of ground granulated blast furnace slag and 2.75 parts by weight of a retarding/suspending system. A second part of the composition is prepared by mixing 74.75 parts by weight of beta anhydrite, 10.00 parts by weight of sodium bentonite, 6.0 parts by weight of calcium oxide, 5.0 parts by weight of pulverised fly ash, 3.0 parts by weight of calcium sulphate dehydrate, 1.0 parts by weight of sodium carbonate and 0.25 parts by weight of lithium carbonate.

Each part is thoroughly mixed with water at 20° C. in a water:solids ratio of 2.5:1 to form a slurry.

A blast hole is drilled to a depth of 100 foot (30 m) and then an explosive charge such as the Orica seismic gelatine dynamite Geogel™ is inserted into the blast hole. The two parts of the composition prepared as described above are then poured into the blast hole. After 7 days, the explosive charge is detonated and no disturbance of the blast hole is detectable at ground level at or near the blast hole after detonation.

A further blast hole is drilled to a depth of 100 foot (30 m) and an explosive charge such as the Orica seismic gelatine dynamite Geogel™ is inserted into the blast hole. After 3 days, the blast hole has filled with water and the two parts of the composition prepared as described above are then piped into the blast hole using a tremie method. The two parts of the composition are used in equal volumes and with a water to solids weight ratio of 2.38:1. After 7 days, the explosive charge is detonated and no disturbance of the blast hole is detectable at ground level at or near the blast hole after detonation.

A further blast hole is drilled to a depth of 100 foot (30 m) using a hollow metal drill stem. The hollow drill stem is then flushed with water. The two parts of the composition prepared as described above are then placed in the blast hole using a tremie method to form a stemming material. The two parts of the composition are used in equal volumes and with a water to solids weight ratio of 2.38:1. Finally, an explosive charge such as the Orica seismic gelatine dynamite Geogel™ is pushed through the stemming material to the distal end of the blast hole. After 7 days, the explosive charge is detonated and no disturbance of the blast hole is detectable at ground level at or near the blast hole after detonation.

EXAMPLE 3

A cement composition may be prepared as described in Example 1 of US patent publication 2004/0050300 at paragraphs 45-62 at page 3 by preparing a first part comprising 30.89% by weight of the first part of type 1 Portland cement, 12.61% by weight of the first part of ground granulated blast furnace slag (GGBFS), 0.10% by weight of the first part of welan gum, 0.50% by weight of the first part of sodium gluconate and 55.61% by weight of the first part of water. A second part is prepared by mixing 30.88% by weight of the second part of sodium silicate (3.3:1 molar ratio of silica to sodium oxide) and 69.11% by weight of the second part of water.

Welan gum is a suspension agent to prevent settling out of the cement solids and thereby facilitate pumpability after storage under static conditions. Sodium gluconate is a retarder for the hydration reaction of the Portland cement. Type 1 is a designation for Portland cement used in the USA according to ASTM C150-00. The amount of GGBFS based on the total weight of the two parts of the composition is 6%. The first part is in the form of a slurry and the second part is in the form of a solution.

The first part is prepared by first blending the Portland cement, Welan gum, GGBFS and gluconate and the mixture thus formed (which was in the form of a powder) then added to the water.

The second part has an indefinite pumping life and the first part has a pumping life of several weeks when stored at 15° C. under static conditions i.e. without agitation.

A blast hole is drilled to a depth of 100 foot (30 m) and then an explosive charge such as the Orica seismic gelatine dynamite Geogel™ is inserted into the blast hole. The two parts of the composition prepared as described above are then poured into the blast hole in equal volumes and having a water to solids weight ratio of 2.38:1. After 7 days, the explosive charge is detonated and no disturbance of the blast hole is detectable at ground level at or near the blast hole after detonation.

A further blast hole is drilled to a depth of 100 foot (30 m) and an explosive charge such as the Orica seismic gelatine dynamite Geogel™ is inserted into the blast hole. After 3 days, the blast hole has filled with water and the two parts of the composition prepared as described above are then piped into the blast hole using a tremie method to form a stemming material. The two parts of the composition are used in equal volumes and with a water to solids weight ratio of 2.38:1. After 7 days, the explosive charge is detonated and no disturbance of the blast hole is detectable at ground level at or near the blast hole after detonation.

A further blast hole is drilled to a depth of 100 foot (30 m) using a hollow metal drill stem. The hollow drill stem is then flushed with water. The two parts of the composition prepared as described above are then placed in the blast hole using a tremie method to form a stemming material. The two parts of the composition are used in equal volumes and with a water to solids weight ratio of 2.38:1. Finally, an explosive charge such as the Orica seismic gelatine dynamite Geogel™ is pushed through the stemming material to the distal end of the blast hole. After 7 days, the explosive charge is detonated and no disturbance of the blast hole is detectable at ground level at or near the blast hole after detonation.

EXAMPLE 4

A stemming material composition was produced by mixing 14.29 wt % of a LAFARGE FONDU high alumina cement having a surface area of 298 $m^2$/kg with 11.29 wt % of beta-anhydrite, 0.71 wt % of calcium oxide, 2.29 wt % of a natural calcium montmorillonite clay which had been activated by the addition of 3% by weight of the clay of sodium carbonate, 71.32 wt % of water (water to solids weight ratio of 2.57:1) and sufficient citric acid for the stemming material to have a 20 minute working time (from about 0.1 to 0.5 wt %).

The beta-anhydrite used was a material ground to 98% by weight minus 100 mesh BSS.

A blast hole is drilled to a depth of 100 foot (30 m) and then an explosive charge such as the Orica seismic gelatine dynamite Geogel™ is inserted into the blast hole. The composition prepared as described above is then poured into the blast hole. After 7 days, the explosive charge is detonated and no disturbance of the blast hole is detectable at ground level at or near the blast hole after detonation.

A further blast hole is drilled to a depth of 100 foot (30 m) and an explosive charge such as the Orica seismic gelatine dynamite Geogel™ is inserted into the blast hole. After 3 days, the blast hole has filled with water and the composition prepared as described above is then piped into the blast hole using a tremie method to form a stemming material. After 7 days, the explosive charge is detonated and no disturbance of the blast hole is detectable at ground level at or near the blast hole after detonation.

A further blast hole is drilled to a depth of 100 foot (30 m) using a hollow metal drill stem. The hollow drill stem is then flushed with water. The composition prepared as described above is then placed in the blast hole using a tremie method to form a stemming material. Finally, an explosive charge such as the Orica seismic gelatine dynamite Geogel™ is pushed through the stemming material to the distal end of the blast hole. After 7 days, the explosive charge is detonated and no disturbance of the blast hole is detectable at ground level at or near the blast hole after detonation.

The invention claimed is:

1. A method of preparing a blast hole which method comprises the steps of:
   drilling a blast hole;
   placing explosives in the blast hole;
   filling the blast hole with a stemming material comprising a cement composition and water wherein the weight ratio of water to solids content of the stemming material is at least about 1:1.

2. A method as defined in claim 1 wherein the stemming material is pumpable.

3. A method as defined in claim 1 wherein the cement composition comprises a cement comprising calcium oxide, calcium hydroxide, Portland cement and/or a high alumina cement; and optionally one or more of the following ingredients:
   (a) a calcium sulphate source;
   (b) a reactive silica source;
   (c) a suspension agent;
   (d) a retarding agent; and/or
   (e) an additive.

4. A method as defined in claim 1 wherein the cement composition comprises a reactive silica source and an activator.

5. A method as defined in claim 4 wherein the reactive silica source is a pozzolan; and/or wherein the activator is an alkali.

6. A method as defined in claim 1 wherein after the placing step, the method comprises a step of preparing a stemming material by mixing the cement composition with the water.

7. A method as defined in claim 6 wherein the cement composition is a two part cement composition comprising a first component and a second component and wherein the preparing step comprises mixing the first component with the second component wherein the first and/or the second cement components contain the water.

8. A method as defined in claim 7 wherein the first component comprises a cement, water, optionally a reactive silica source, optionally a retarding agent and optionally a suspension agent.

9. A method as defined in claim 7 wherein the second component comprises a reactive silica source, a calcium sulphate source, water and/or a cement.

10. A method as defined in claim 7 wherein the two part cement composition is ettringite-forming.

11. A method as defined in claim 10 wherein a first part of the two part ettringite-forming cement composition comprises water, a reactive silica source, and a high alumina cement and wherein a second part of the two part ettringite-forming cement composition comprises water, a calcium sulphate source and calcium oxide and/or calcium hydroxide.

12. A method as defined in claim 11 wherein the high alumina cement has a C:A molar ratio of greater than 1:1.

13. A method as defined in claim 7 wherein the two part cement composition has a first part comprising Portland cement, water, optionally a retarding agent and optionally a suspension agent and a second part comprising an aqueous solution of a reactive silica source.

14. A method defined in claim 6 wherein the preparing step is carried out in the blast hole or in a mixer placed near or above the blast hole.

15. A method as defined in claim 1 wherein the cement composition is a one part cement composition which is ettringite forming.

16. A method as defined in claim 15 wherein the ettringite-forming cement composition comprises a high alumina cement, a calcium sulphate source and optionally calcium oxide and/or calcium hydroxide.

17. A method as defined in claim 16 wherein the ettringite-forming cement composition comprises high alumina cement and the calcium sulphate source in a weight ratio of from 3:7 to 4:1.

18. A method as defined in claim 1 wherein the weight ratio of water to solids is at least about 1.5 to 1.

19. A method as defined in claim 1 wherein the blast hole contains water and the filling step comprises use of a tremie method.

20. A method as defined in claim 1 wherein the method comprises the sequential steps of:
   (i) drilling a blast hole;
   (ii) filling the blast hole with a stemming material comprising a cement composition and water wherein the weight ratio of water to solids content of the stemming material is at least about 1:1; and
   (iii) placing explosives in the blast hole.

21. A method as defined in claim 20 wherein the blast hole contains water and the filling step comprises use of a tremie method.

22. A blast hole having a proximal end at ground level and a distal end wherein the blast hole has an explosive at its distal end and wherein the blast hole is filled with a stemming material comprising a cement composition and water wherein the weight ratio of water to solids content of the stemming material is at least about 1:1.

* * * * *